United States Patent [19]
Weiler

[11] 4,042,157
[45] Aug. 16, 1977

[54] WHEEL AND TIRE CARRIER FOR ATTACHMENT TO MOTOR VEHICLE DOOR

[76] Inventor: Raywood C. Weiler, 17586 Vine St., Fontana, Calif. 92335

[21] Appl. No.: 577,403

[22] Filed: May 14, 1975

[51] Int. Cl.² .......................................... B62D 43/02
[52] U.S. Cl. ........................... 224/42.21; 224/42.45 R; 248/226.4
[58] Field of Search ............... 224/29 R, 42.12, 42.13, 224/42.15, 42.19, 42.21, 42.24, 42.26, 42.45 R; 214/451, 453, 454; 296/37.2, 146; 248/207, 226 A, 226 B, 226 D, 226 E, 227; 16/137

[56] References Cited
U.S. PATENT DOCUMENTS

| | | | |
|---|---|---|---|
| 1,672,356 | 6/1928 | Wasserfallen | 224/42.21 X |
| 1,719,821 | 7/1929 | Alexander | 224/42.45 R X |
| 1,962,835 | 6/1934 | Pawsat | 224/42.15 |
| 2,320,856 | 6/1943 | Ehlers | 296/37.2 X |
| 3,103,289 | 9/1963 | Clary | 224/42.08 X |
| 3,371,832 | 3/1968 | Sekino | 224/42.21 |
| 3,482,749 | 12/1969 | Cooper | 224/42.24 X |
| 3,894,668 | 7/1975 | Chapman | 224/42.24 X |

FOREIGN PATENT DOCUMENTS
1,057,736  3/1954  France .............................. 296/37.2

OTHER PUBLICATIONS
J. C. Whitney & Co., Index and Order Blank 168-170, Catalog No. 314, Copyright 1973, p. 31.

*Primary Examiner*—Robert J. Spar
*Assistant Examiner*—Winston H. Douglas
*Attorney, Agent, or Firm*—Arnstein, Gluck, Weitzenfeld & Minow

[57] ABSTRACT

A wheel and tire carrier for attachment to the door of a motor vehicle in which the door is hingedly supported adjacent its rear edge by upper and lower hinge means, the wheel and tire carrier comprising a pair of members each connected at their one end to the door adjacent the front edge thereof, and the other end of each of said pair of members secured to an independent clamping means, one of the clamping means adapted to be independently clamped to the upper hinge means and the other clamping means adapted to be independently clamped to the lower hinge means, with each of said clamping means adapted to be clamped to its respective hinge means independently of the other. The wheel and tire carrier has means supported by the pair of members to which a tire wheel is attached.

5 Claims, 5 Drawing Figures

U.S. Patent    Aug. 16, 1977    4,042,157
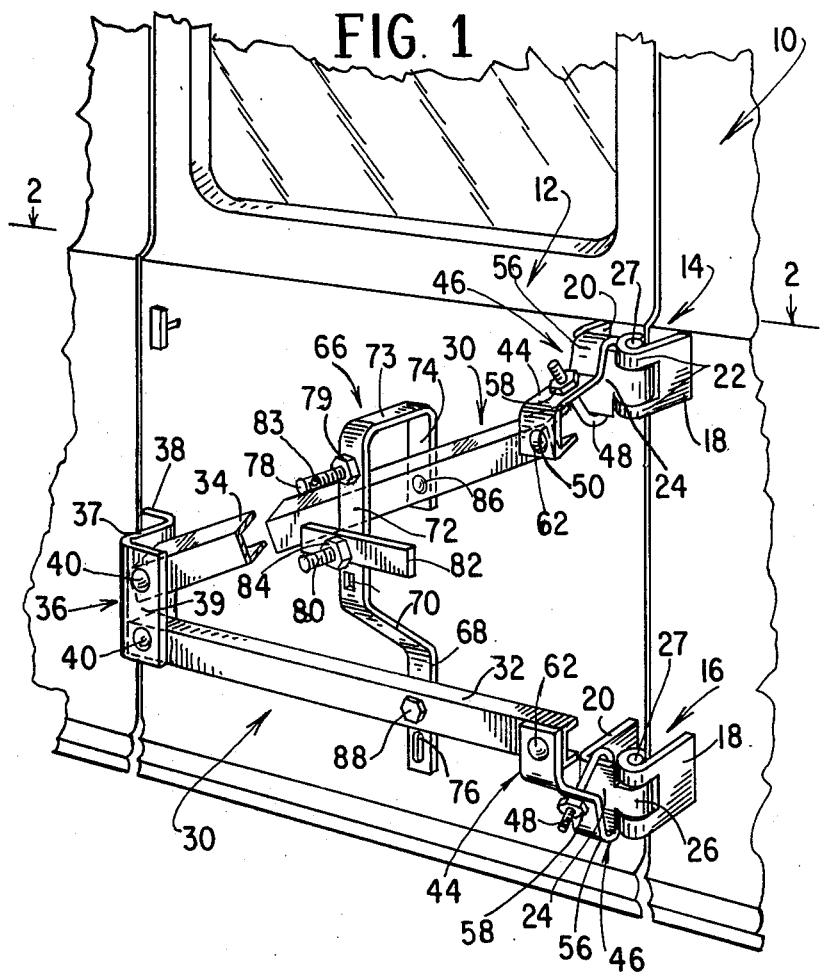
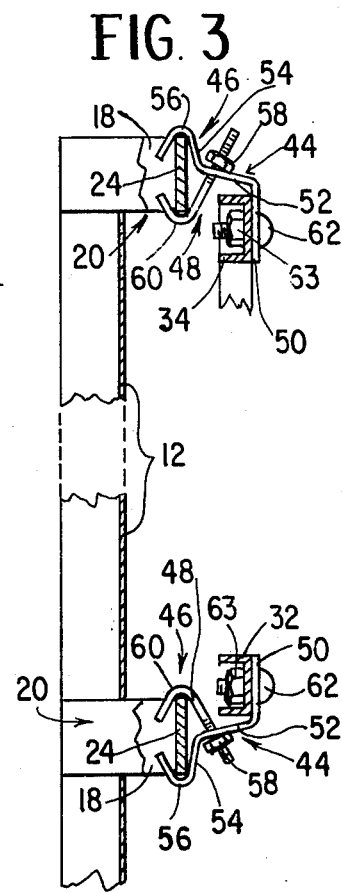
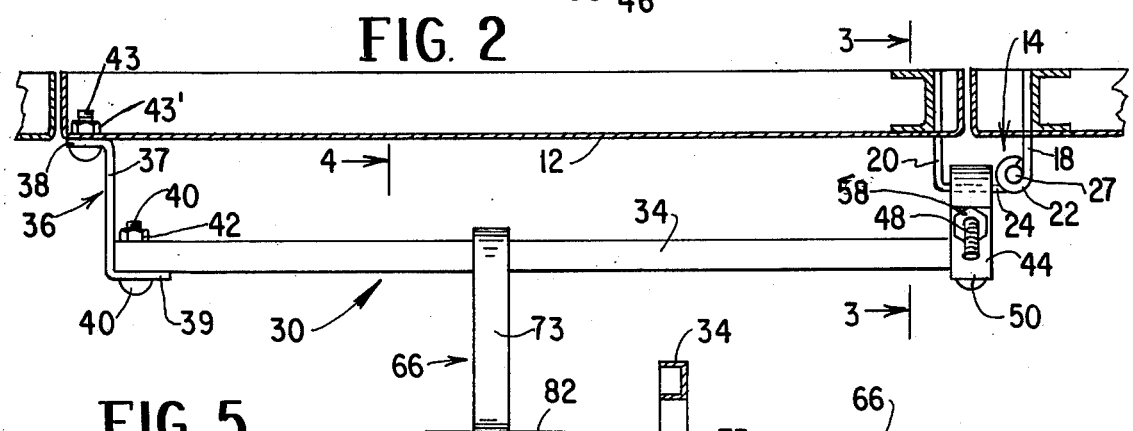
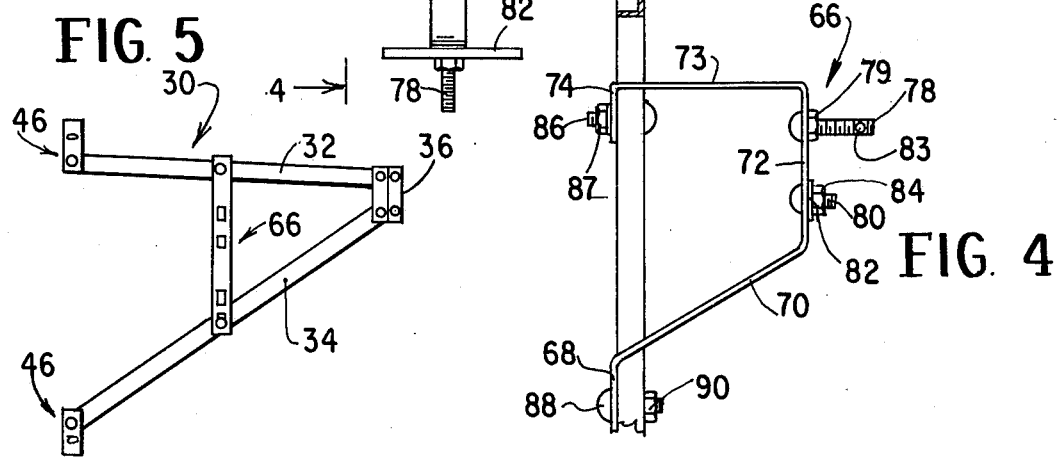

WHEEL AND TIRE CARRIER FOR ATTACHMENT TO MOTOR VEHICLE DOOR

BRIEF SUMMARY OF THE INVENTION

Applicant is cognizant of the wheel and tire carriers on the market which are attached to the door of a motor vehicle, however, such wheel and tire carriers are attached to the door hinges by means of bolts which are inserted into openings which have to be made in hard hinge members as said hinge members do not have the openings through which the bolts can be secured and thus it is necessary that openings be drilled into the steel hinge members to accommodate the bolts for supporting the tire carrier. This laborious procedure requires time and effort and could void the warranty on a vehicle due to the fact that holes are drilled into the hinge members.

Various attempts have also been made to clamp a wheel and tire carrier to the hinge means but said clamping means are not each independently clamped to the upper and lower hinge means but are connected by a rod which extends between and connects the upper and lower clamping means. This is also objectionable in that it adds parts which increases the cost of the unit and increases the time for installation of the unit.

The objections to the foregoing are eliminated with this invention which provides a wheel and tire carrier having a pair of independent clamping means, one of which is independently clamped to the upper hinge means and the other independently clamped to the lower hinge means. The wheel and tire carrier of this invention is particularly applicable for rear doors for vans, club wagons, sportsman wagons, sportsvans, and mini motor-homes.

This invention is packaged in a disassembled condition and is readily assembled for use.

BRIEF DESCRIPTION OF THE DRAWINGS

In the drawings:

FIG. 1 is a perspective view showing this invention attached to a right-hand door.

FIG. 2 is a top plan view taken on line 2—2 of FIG. 1 and partly in section.

FIG. 3 is a view partly in section taken on line 3—3 of FIG. 2.

FIG. 4 is a side elevational view taken on line 4—4 of FIG. 2; and

FIG. 5 is a side elevational view of this invention as applied to a left-hand door.

FIGS. 1-4

The wheel and tire carrier in FIGS. 1 to 4, inclusive, is shown mounted on a right-hand door of a vehicle, namely, a door which is hinged on the right side of the door, as viewed in FIG. 1.

The vehicle body, generally designated at 10, has the conventional door generally designated at 12. As shown in FIG. 1, the door is hingedly supported by conventional upper and lower hinge means generally indicated at 14 and 16, respectively. Each of said hinge means includes a pair of conventional hinge members 18 and 20 which extend outwardly of the vehicle body and the door. Hinge member 18 is secured to the vehicle body 10 and the other hinge member 20 is secured to the door 12. The hinge member 18 extends outwardly of the vehicle body and has spaced curled ears 22. The other hinge member 20 is secured to the door and extends outwardly thereof and is bent at right angles to form a front end 24 which is parallel to the door. The front end 24 has a reduced curled ear 26 which fits between the spaced ears 22 of the hinge 18 and is hingedly secured thereto by a pintle 27 passing therethrough, said hinge means being conventional.

The wheel and tire carrier forming this invention is generally indicated at 30 and includes a pair of members 32 and 34 each formed of a channel strip of steel having a generally U-shaped configuration in transverse section. One end of each of said members 32 and 34 is secured by conventional bolts and nuts to a Z-shaped steel plate generally indicated at 36. The Z-shaped plate 36 has an intermediate portion 37 and end portions 38 and 39 which are turned in opposite directions but are parallel to each other. The end portion 39 has a pair of spaced openings. The members 32 and 34 each have an opening adjacent the ends thereof which are alined with the openings in the Z-shaped plate 36 so that the bolts 40 can be passed therethrough and by means of nuts 42 secure the members 32 and 34 to plate 36. The opposite end 38 of plate 36 has a pair of spaced openings which are adapted to receive bolts 43 which are received in one-quarter inch holes drilled in the front edge of the sheet metal door 12 and is secured by a nuts 43' which serve to retain the Z-plate 36 secured to the door. The opposite end portion 39 of the Z-plate is parallel to the door but offset outwardly from the outer plane of the door.

Secured to the opposite end of each of the members 32 and 34 is the steel bracket 44 of the clamping means generally indicated at 46. The clamping means 46 are of identical construction, however, the upper clamping means shown in FIG. 1 extends upwardly of the member 34 whereas the lower clamping means extends downwardly of the member 32. Each of the clamping means 46 includes the bracket 44 and a J-bolt 48. The bracket 44 is shaped to the configuration shown, having at one end a vertical section 50 which continues inwardly to form an intermediate section 52 which then continues upwardly to form a generally vertical section 54 which terminates in a downwardly extending hook 56 to engage the hinge.

The intermediate section 52 is inclined with respect to the vertical section 50 and the section 54 is slightly inclined with respect to the intermediate section 52. The intermediate section 52 is provided with an opening for receiving the threaded stem of the J-bolt 48. The hook end 60 of the J-bolt engages the hinge. The bracket 44 is secured to member 34, as shown in FIG. 1, by a threaded bolt 62 passing through the openings in the bracket and the member 34. A nut 63 is secured to the end of the bolt. The lower bracket 44 of the clamping means 46, shown in FIG. 1, is secured to the lower member by a similar bolt and nut 62 and 63, respectively, and is inverted with respect to the upper clamping means.

The hook 56 of the bracket 44 is hooked over and is secured to the front end 24 of the hinge member 20, as best seen in FIG. 3. Said front end of the hinge is offset and spaced outwardly of the plane of the door and provides a sufficiently spaced area to accommodate the hook end 56 as well as the hook 60 of the J-bolt 58. The hook 60 of the J-bolt will engage the underside of the front end 24 of the top hinge member. As shown in FIG. 1 in relation to a right-hand door, the hook end 56 of the bracket 44 extends over the front end 24 of the hinge, with the hook 60 of the J-bolt 48 extending against the underside of the hinge, whereas with respect to the lower member 32, the hook 60 of the J-bolt extends over the top of the front end 24 of the hinge 20, with the hook of the bracket 44 extending under the front end 24 of the hinge. Rotation of the nut 58 will permit loosening of the J-bolt 48 with respect to the bracket 44 to permit the hooking of the clamp means 46 to the hinge and then by rotating the nut in the opposite direction the J-bolt can be tightened with respect to the front end 24 of the hinge member.

A steel bracket generally indicated at 66 is secured to the members 32 and 34. The bracket has a vertical end section 68 which continues with an upwardly inclined section 70 and then continues with a vertical section 72 and then continues with a horizontal section 73 and terminates in a downwardly extending vertical section 74. As can best be seen in FIG. 4, the lower vertical section 68 and the upper vertical section 74 are in the same vertical plane, with the intermediate vertical section 72 offset and spaced outwardly from the upper and lower vertical sections. The lower vertical section 68 is provided with a pair of openings 76. The intermediate vertical section 72 is provided with three spaced openings. The upper opening accommodates a threaded bolt 78 secured thereto by means of a nut 79. The other opening accommodates a threaded bolt 80 which supports a cross strap 82 through which the bolt extends and same is secured by a nut 84.

The conventional wheel and tire is secured to the bolts 78 and 80 which extend through suitable openings in the conventional wheel, which wheel openings are alined with the bolts 78 and 80 so that the wheel may be placed thereon and the wheel is secured thereto by nuts (not shown) on the ends of said threaded bolts 78 and 80. The bolt 78 has a hole 83 to receive a small standard padlock (not shown) to lock the spare wheel and tire to the carrier. The top downwardly vertically extending portion 74 of the bracket 66 has an opening which is alined with the opening in the member 34 to receive a threaded bolt 86 and same is secured thereto by a nut 87. The bottom vertical portion 68 of the bracket 66 has its opening alined with an opening in the member 32 to receive a bolt 88 which is secured thereto by means of a nut 90. Thus, the bracket 66 to which the wheel is directly connected is vertically supported between the pair of members 32 and 34.

FIG. 5

When the wheel and tire carrier 30 is mounted on a right-hand door the member 32 is the bottom member and the member 34 is the inclined upper member. When the wheel and tire carrier 30 is mounted on a left-hand door, as shown in FIG. 3, the wheel and tire carrier is inverted from the position shown in FIG. 1 to that shown in FIG. 5, where the member 32 is positioned above the inclined member 34. The clamping means 46 are now on the left side of the unit to be clamped to hinges on the left side of the door and the Z-shaped plate 36 is now on the right side to be secured to the right side of the door.

What is claimed is:

1. A wheel and tire carrier for attachment to the door of a motor vehicle in which the door is hingedly supported adjacent its hinged edge by upper and lower hinge means, with each of said hinge means having a front end offset outwardly of the front plane of the door, said wheel and tire carrier comprising a pair of substantially co-planar support members, each connected at their one end to the door adjacent to the opposite free edge thereof for limited pivotal adjustment, and diverging therefrom towards said upper and lower hinge means, independent and separated clamping means, adapted for readily attachable and detachable connection at each of said hinge means, affixed to the opposite end of each of said support members, each of said clamping means comprising a bracket having a substantially vertical end portion pivotally joined to said last mentioned end of each support member, a hook at an opposite end portion; which is adapted to hook around one edge of the front offset end of the hinge means, and an inclined intermediate section between said end portions, a J-bolt extending through said intermediate section of said bracket with the hook of said J-bolt adapted to hook around the other edge of the front offset end of the same hinge means, with the stem of the J-bolt threaded to receive a nut to lock said clamping means to said hinge means, one of said clamping means adapted to be independently clamped to the front offset end of said upper hinge means, and the other of said clamping means adapted to be independently clamped to the front offset end of said lower hinge means, said front offset end of each of said hinge means having no opening therein to permit attachment thereto, and a bracket means connected to said support members at intermediate points thereof and extending from one support member to the other support member for attachment of a tire wheel thereto, and one of said connections being adjustable to accommodate a variable spacing between said support members.

2. A wheel and tire carrier as set forth in claim 1 in which the support members each connected at their one end are connected to a plate which in turn is secured to the door adjacent the free edge of the door.

3. A wheel and tire carrier as set forth in claim 2 in which the plate is of a Z-shaped configuration.

4. A wheel and tire carrier as set forth in claim 1 in which the clamping means clamped to the upper hinge means has the hook end of the bracket engaging the top edge of the front offset end of the hinge means and the hook of the J-bolt engaging the bottom edge of the front offset end of the upper hinge means.

5. A wheel and tire carrier as set forth in claim 4 in which the clamping means clamped to the lower hinge means is reversed from that of the upper clamping means so that the hook of the bracket engages the bottom edge of the front offset end of the lower hinge means and the hook of the J-bolt engages the top edge of the front offset end of the lower hinge means.

* * * * *